US012479995B2

United States Patent
Ogawa et al.

(10) Patent No.: US 12,479,995 B2
(45) Date of Patent: Nov. 25, 2025

(54) CURABLE LIQUID SILICONE COMPOSITION, CURED PRODUCT OF CURABLE LIQUID SILICONE COMPOSITION, OPTICAL FILLER INCLUDING CURABLE LIQUID SILICONE COMPOSITION, AND DISPLAY DEVICE INCLUDING LAYER COMPRISING CURED PRODUCT OF CURABLE LIQUID SILICONE COMPOSITION

(71) Applicant: DOW TORAY CO., LTD., Tokyo (JP)

(72) Inventors: Takuya Ogawa, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 649 days.

(21) Appl. No.: 17/800,213

(22) PCT Filed: Feb. 19, 2021

(86) PCT No.: PCT/JP2021/006286
§ 371 (c)(1),
(2) Date: Aug. 16, 2022

(87) PCT Pub. No.: WO2021/167052
PCT Pub. Date: Aug. 26, 2021

(65) Prior Publication Data
US 2023/0101321 A1    Mar. 30, 2023

(30) Foreign Application Priority Data
Feb. 21, 2020    (JP) ................................. 2020-028127

(51) Int. Cl.
| | | |
|---|---|---|
| C08L 83/04 | (2006.01) | |
| C08G 77/00 | (2006.01) | |
| C08G 77/04 | (2006.01) | |
| C08K 5/5419 | (2006.01) | |
| C08K 5/5425 | (2006.01) | |
| G02B 1/04 | (2006.01) | |
| H10H 20/854 | (2025.01) | |
| C08G 77/12 | (2006.01) | |
| C08G 77/20 | (2006.01) | |

(52) U.S. Cl.
CPC ............ *C08L 83/04* (2013.01); *C08G 77/045* (2013.01); *C08G 77/80* (2013.01); *C08K 5/5419* (2013.01); *C08K 5/5425* (2013.01); *G02B 1/04* (2013.01); *H10H 20/854* (2025.01); *C08G 77/12* (2013.01); *C08G 77/20* (2013.01)

(58) Field of Classification Search
CPC ...... H10H 20/854; C08L 23/296; C08G 77/80
See application file for complete search history.

(56) References Cited

U.S. PATENT DOCUMENTS

| | | | |
|---|---|---|---|
| 4,234,713 A * | 11/1980 | LeGrow ................. | C08L 83/04 528/33 |
| 4,359,369 A | 11/1982 | Takamizawa et al. | |
| 4,558,147 A | 12/1985 | Eckberg et al. | |
| 7,863,392 B2 * | 1/2011 | Nakanishi ................ | G02B 1/04 528/33 |
| 2007/0025678 A1 * | 2/2007 | Kushibiki ............... | C08L 83/04 385/141 |
| 2007/0299165 A1 | 12/2007 | Haitko et al. | |
| 2009/0118440 A1 | 5/2009 | Nakanishi et al. | |
| 2011/0311788 A1 | 12/2011 | Tagami et al. | |
| 2012/0172544 A1 | 7/2012 | Liang et al. | |
| 2013/0256741 A1 * | 10/2013 | Harkness ............... | C08G 77/20 252/500 |
| 2013/0256742 A1 * | 10/2013 | Harkness ............... | C08L 83/04 524/783 |
| 2014/0008697 A1 * | 1/2014 | Harkness ............... | C08L 83/04 524/588 |
| 2015/0210905 A1 | 7/2015 | Hoshino et al. | |
| 2017/0342198 A1 | 11/2017 | Ogawa et al. | |
| 2019/0196331 A1 | 6/2019 | Maruyama et al. | |
| 2019/0233692 A1 | 8/2019 | Otomo et al. | |
| 2020/0032111 A1 | 1/2020 | Ogawa et al. | |
| 2020/0071580 A1 | 3/2020 | Ogawa et al. | |
| 2024/0191017 A1 | 6/2024 | Ogawa et al. | |

FOREIGN PATENT DOCUMENTS

| | | |
|---|---|---|
| CA | 1185734 A | 4/1985 |
| CN | 105315675 A | 2/2016 |
| CN | 110291156 A | 9/2019 |
| CN | 110894361 A | 3/2020 |
| EP | 3034535 A1 | 6/2016 |
| JP | 2007008996 A | 1/2007 |
| JP | 2007246894 A | 9/2007 |

(Continued)

OTHER PUBLICATIONS

English translation of International Search Report for PCT/JP2021/006286 dated Apr. 27, 2021, 3 pages.

(Continued)

*Primary Examiner* — Marc S Zimmer
(74) *Attorney, Agent, or Firm* — Warner Norcross + Judd LLP

(57) ABSTRACT

A photocurable liquid silicone composition, having a low viscosity that facilitates injection into a small gap, having a refractive index (pre-cure) that is high not only in a visible region but also in an infrared region, and that is particularly useful as a material for a device using an infrared LED light source, is provided. The composition comprises: (A): (A1) an organosilane or organopolysiloxane having 1 to 5 silicon atoms, having an alkenyl group, and having at least one monovalent functional group selected from aromatic groups and aralkyl groups, and/or (A2) an organopolysiloxane having 2 to 5 silicon atoms, having an alkenyl group, and not having a monovalent functional group selected from aromatic groups and aralkyl groups; (C) a compound having at least two silicon-bonded hydrogen atoms; and (D) a hydrosilylation reaction catalyst. Pre-cure, the refractive index of the entire liquid composition is ≥1.47, and the viscosity is ≤500 mPa·s.

10 Claims, No Drawings

(56) References Cited

FOREIGN PATENT DOCUMENTS

| | | | |
|---|---|---|---|
| JP | 2008303343 A | 12/2008 |
| JP | 2012001668 A | 1/2012 |
| JP | 2012140617 A | 7/2012 |
| JP | 2013139547 A | 7/2013 |
| JP | 2013256587 A | 12/2013 |
| JP | 2014205823 A | 10/2014 |
| JP | 2016003311 A | 1/2016 |
| JP | 2016084373 A | 5/2016 |
| JP | 6150415 B2 | 6/2017 |
| JP | 2017119848 A | 7/2017 |
| JP | 2018090806 A | 6/2018 |
| JP | 2018111792 A | 7/2018 |
| JP | 2018184574 A | 11/2018 |
| JP | 2019117325 A | 7/2019 |
| JP | 2019520438 A | 7/2019 |
| WO | WO 2022/169556 A1 * | 8/2000 |
| WO | 2016098305 A1 | 6/2016 |
| WO | 2016167347 A1 | 10/2016 |
| WO | 2018066379 A1 | 4/2018 |

OTHER PUBLICATIONS

Machine assisted English translation of JP2018184574A obtained from https://patents.google.com/patent on Dec. 4, 2022, 11 pages.
Machine assisted English translation of JP2014205823A obtained from https://patents.google.com/patent on Dec. 4, 2022, 9 pages.
Machine assisted English translation of JP2016003311A obtained from https://patents.google.com/patent on Dec. 4, 2022, 13 pages.
Machine assisted English translation of JP2013139547A obtained from https://patents.google.com/patent on Dec. 4, 2022, 9 pages.
Machine assisted English translation of JP2013256587A obtained from https://patents.google.com/patent on Dec. 4, 2022, 9 pages.
Machine assisted English translation of JP2017119848A obtained from https://patents.google.com/patent on Dec. 4, 2022, 19 pages.
English translation of International Search Report for PCT/JP2021/006285 dated Apr. 20, 2021, 2 pages.
Machine assisted English translation of WO2016167347A1 obtained from https://patents.google.com/patent on Dec. 4, 2022, 18 pages.
Machine assisted English translation of JP2018111792A obtained from https://patents.google.com/patent on Dec. 4, 2022, 13 pages.
Machine assisted English translation of JP2016084373A obtained from https://patents.google.com/patent on Dec. 4, 2022, 11 pages.
Machine assisted English translation of JP2007246894A obtained from https://patents.google.com/patent on Dec. 4, 2022, 10 pages.
Machine assisted English translation of JP2008303343A obtained from https://patents.google.com/patent on Dec. 4, 2022, 13 pages.
Machine assisted English translation of CN110894361A obtained from https://patents.google.com/patent on Dec. 4, 2022, 11 pages.
English translation of International Search Report for PCT/JP2021/006287 dated Apr. 27, 2021, 3 pages.
Machine assisted English translation of CN105315675A obtained from https://worldwide.espacenet.com/patent on Mar. 25, 2024, 27 pages.
Machine assisted English translation of JP6150415B2 obtained from <https://patents.google.com/patent> on Aug. 20, 2024, 18 pages.

* cited by examiner

CURABLE LIQUID SILICONE COMPOSITION, CURED PRODUCT OF CURABLE LIQUID SILICONE COMPOSITION, OPTICAL FILLER INCLUDING CURABLE LIQUID SILICONE COMPOSITION, AND DISPLAY DEVICE INCLUDING LAYER COMPRISING CURED PRODUCT OF CURABLE LIQUID SILICONE COMPOSITION

CROSS-REFERENCE TO RELATED APPLICATIONS

This application is the U.S. National Stage of International Application No. PCT/JP2021/006286 filed on 19 Feb. 2021, which claims priority to and all advantages of Japanese Patent Application No. 2020-028127 filed on 21 Feb. 2020, the content of which is incorporated herein by reference.

TECHNICAL FIELD

The present invention relates to: curable liquid silicone composition that can be cured by heat treatment and that provides a cured product with low viscosity and a high refractive index, which are particularly preferable for injection molding; a cured product thereof; and an application thereof. The curable liquid silicone composition of the present invention has a high refractive index and transparency and is suitable as a material for forming light-transparent layers for electronic and electrical devices and optical devices.

BACKGROUND ART

A wide range of electronic and electrical devices and optical devices using white and ultraviolet LEDs as light sources have been commercialized. Silicone materials are being actively considered as peripheral materials due to the need for high transparency and reliability. Liquid silicone compositions with a high refractive index, as disclosed in Patent Document 1, for example, are already in practical use as liquid sealing materials that directly seal a light source. Furthermore, infrared LED light sources and devices using them are also being actively developed in anticipation of large markets for various sensors, monitoring cameras, infrared data communications, and the like. On the other hand, in addition to these conventional LEDs, micro-LED technology, which takes advantage of the high energy efficiency thereof, is being rapidly researched and developed, and is beginning to be applied to a variety of applications.

Herein, micro-LEDs and the like that have been under research in recent years have extremely small light source substrates, and often require peripheral materials to have a small area and a thin layer. In this case, an injection molding method, in which a curable composition is injected into a gap between a light source substrate and a transparent substrate and then cured, is considered promising as a technique for forming a sealing layer therebetween. Materials suitable for this processing method must be low-viscosity liquid silicone materials that can be cured quickly and have high transparency after curing. Furthermore, materials with a high refractive index are desired in order to reduce interfacial reflections and increase light extraction efficiency.

However, previously known high-refractive index liquid silicone compositions may not be able to be injected into minute gaps between members (hereinafter, referred to as "small gaps") or may not achieve sufficient gap filling properties when applied to the injection molding method due to the high overall viscosity of the composition. For example, the curable liquid silicone composition disclosed in Patent Document 1 described above cannot be used for the injection molding method because the overall viscosity of the composition at 25° C. is very high at 3,000 mPa·s or higher. Specifically, even if a curable liquid silicone composition with such high viscosity is injected between a light source substrate and a transparent substrate for sealing, injection that can sufficiently fill the gap between the two is difficult, which may cause process defects and sealing failures, resulting in lower production efficiency and yield, lower quality and failure of a final displaying device, which is not preferred.

PRIOR ART DOCUMENTS

Patent Documents

Patent Document 1: Japanese Unexamined Patent Application 2007-008996 (Japanese Patent No. 5392805)

SUMMARY OF THE INVENTION

Problems to be Solved by the Invention

An object of the present invention is to provide: a curable liquid silicone composition that has low viscosity that facilitates injection into a small gap, cures quickly by maintaining at room temperature or heat treating, has a refractive index after curing that is high not only in a visible region but also in an infrared region, and is particularly useful as a material for a device using an infrared LED light source; a cured product thereof; and an application thereof.

Means for Solving the Problems

A curable liquid silicone composition of the present invention, contains:
- (A) one or more types of organosilicon compound selected from the following component (A1) and component (A2):
- (A1) an organosilane or organopolysiloxane having 1 to 5 silicon atoms, having at least two alkenyl groups with 2 to 12 carbon atoms in a molecule, and having at least one monovalent functional group selected from aromatic groups with 6 to 12 carbon atoms and aralkyl groups with 7 to 12 carbon atoms, and
- (A2) a chain or branched-chain organosilane or organopolysiloxane having 2 to 5 silicon atoms, having at least two alkenyl groups with 2 to 12 carbon atoms in a molecule, not having a monovalent functional group selected from aromatic groups with 6 to 12 carbon atoms and aralkyl groups with 7 to 12 carbon atoms, and having a boiling point at ambient pressure of 180° C. or higher;
- (C) a compound having at least two silicon-bonded hydrogen atoms in a molecule {at an amount where the silicon-bonded hydrogen atoms in the component is 0.2 to 3 mols relative to a total of 1 mol of alkenyl groups in the composition}; and
- (D) a hydrosilylation reaction catalyst; and is characterized in that
the refractive index at 25° C. and a wavelength of 847 nm of the entire liquid composition prior to curing is 1.47 or more, and the viscosity of the entire liquid composition measured at 25° C. using an E-type viscometer is 500 mPa·s or less.

Herein, the viscosity of the entire liquid composition measured at 25° C. using an E-type viscometer is preferably 200 mPa-s or less, and particularly preferably within a range of 3 to 175 mPa-s.

A cured product of the present invention is obtained by curing the curable liquid silicone composition described above.

An optical filler of the present invention contains the curable liquid silicone composition described above.

A displaying device of the present invention includes a layer containing a cured product of the curable liquid silicone composition described above.

The curable liquid silicone composition of the present invention can be used in a displaying device, and is particularly preferably used in the manufacture of a displaying device using an infrared LED light source. In other words, a method of manufacturing a displaying device includes a step of injecting the curable liquid silicone composition according to any one of claims 1 to 5 between a substrate for a light source and a transparent substrate, and a step of curing the curable liquid silicone composition after injection by heating.

Effects of the Invention

The curable liquid silicone composition of the present invention has a low viscosity that facilitates injection into a small gap and can cure quickly by maintaining at room temperature or by heat treating. Furthermore, the refractive index after curing is high not only in a visible region but also in an infrared region, making it useful as a material for a device using an infrared LED light source.

MODE FOR CARRYING OUT THE INVENTION

First, the curable liquid silicone composition of the present invention will be described in detail.

Component (A) is one of the characteristic components of the present composition, is a component that allows the curable liquid silicone composition to have a low viscosity without impairing the curability thereof, and is one or more type of organosilicon compound selected from the following component (A1) and component (A2). Such component (A) has low volatility and does not inhibit the curing of the composition of the present invention.

(A1) an organosilane or organopolysiloxane having 1 to 5 silicon atoms, having at least two alkenyl groups with 2 to 12 carbon atoms in a molecule, and having at least one monovalent functional group selected from aromatic groups with 6 to 12 carbon atoms and aralkyl groups with 7 to 12 carbon atoms, and (A2) a chain or branched-chain organosilane or organopolysiloxane having 2 to 5 silicon atoms, having at least two alkenyl groups with 2 to 12 carbon atoms in a molecule, not having a monovalent functional group selected from aromatic groups with 6 to 12 carbon atoms and aralkyl groups with 7 to 12 carbon atoms, and having a boiling point at ambient pressure of 180° C. or higher Component (A) is a silane or siloxane oligomer (polysiloxane with a siloxane degree of polymerization of 5 or less) having a small molecular weight due to the number of silicon atoms being 5 or less, and has at least two alkenyl groups with 2 to 12 carbon atoms that are involved in a curing reaction in a molecule. Therefore, a crosslinking reaction proceeds with component (C) described below. On the other hand, the range of component (A) excludes components that may have an alkenyl group such as a vinyl group or the like, but no aromatic group or aralkyl group, and that do not improve the refractive index and may adversely affect a curing reaction, such as methylsiloxane having a cyclic structure. Such a component (A) has a relatively low molecular weight and low viscosity, yet has low volatility and does not easily inhibit a curing reaction. Therefore, the composition of the present invention containing component (A) exhibits excellent curing reactivity, reduces the viscosity of the entire composition suitable for injection molding, and significantly improves the gap filling properties.

Component (A) may or may not have monovalent functional groups selected from aromatic groups with 6 to 12 carbon atoms and aralkyl groups with 7 to 12 carbon atoms in a molecule, but by having these aromatic groups or aralkyl groups, can improve the refractive index of the liquid silicone composition before curing and in a cured product thereof as described later. Therefore, a component containing these functional groups in at least part of the (A) component. Therefore, a component containing these functional groups is preferably used as at least part of component (A).

Specifically, component (A) is one or more type of organosilicon compound selected from the following component (A1) and component (A2).

(A1) an organosilane or organopolysiloxane having 1 to 5 silicon atoms, having at least two alkenyl groups with 2 to 12 carbon atoms in a molecule, and having at least one monovalent functional group selected from aromatic groups with 6 to 12 carbon atoms and aralkyl groups with 7 to 12 carbon atoms, and (A2) a chain or branched-chain organosilane or organopolysiloxane having 2 to 5 silicon atoms, having at least two alkenyl groups with 2 to 12 carbon atoms in a molecule, not having a monovalent functional group selected from aromatic groups with 6 to 12 carbon atoms and aralkyl groups with 7 to 12 carbon atoms, and having a boiling point at ambient pressure of 180° C. or higher Herein, the number of silicon atoms in component (A1) is 1 to 5 and the number of silicon atoms in component (A2) is 2 to 5. However, the number of silicon atoms in component (A1) or component (A2) is preferably within a range of 2 to 5, and may be and is preferably 2, 3, or 4. This can increase the contribution to lowering the viscosity of the curable composition.

Examples of the alkenyl group in component (A) include vinyl groups, allyl groups, butenyl groups, pentenyl groups, hexenyl groups, heptenyl groups, octenyl groups, nonenyl groups, decenyl groups, undecenyl groups, and dodecenyl groups. From the perspective of economic efficiency and reactivity, vinyl groups, allyl groups, 5-hexenyl groups, and 7-octenyl groups are preferable. This is common in components (A1) and (A2).

The aforementioned component (A1) has, in addition to the aforementioned alkenyl group, at least one monovalent functional group selected from aromatic groups with 6 to 12 carbon atoms and aralkyl groups with 7 to 12 carbon atoms in a molecule. Examples of these functional groups include phenyl groups, tolyl groups, xylyl groups, and other aryl groups with 6 to 12 carbon atoms; and benzyl groups, phenethyl groups, and other aralkyl groups with 7 to 12 carbon atoms. Phenyl groups and phenethyl groups are preferred from the perspective of economic efficiency.

On the other hand, examples of other groups bonded to a silicon atom in component (A) (specifically, groups other than monovalent functional groups selected from alkenyl groups, aromatic groups with 6 to 12 carbon atoms, and aralkyl groups with 7 to 12 carbon atoms described above) include methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferred from the perspective of economic efficiency and heat resistance. Furthermore, the silicon atom in component (A) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like. This is also common in components (A1) and (A2).

Specific examples of component (A1) in the present invention include the following compounds A1-1 to A1-13.
A1-1: Divinyldiphenylsilane
A1-2: 1,3-divinyl-1,3-dimethyl-1,3-diphenyldisiloxane
A1-3: 1,5-divinyl-3,3-diphenyl-1,1,5,5-tetramethyltrisiloxane
A1-4: 1,5-divinyl-1,5-diphenyl-1,3,3,5-tetramethyltrisiloxane
A1-5: 1,5-diphenyl-3,3-divinyl-1,1,5,5-tetramethyltrisiloxane
A1-6: 1,5-diphenethyl-3,3-divinyl-1,1,5,5-tetramethyltrisiloxane
A1-7: 1,7-divinyl-3,3,5,5-tetraphenyl-1,1,7,7-tetramethyltetrasiloxane
A1-8: 1,7-divinyl-1,7-diphenyl-1,3,3,5,5,7-hexamethyltetrasiloxane
A1-9: 1,7-divinyl-3,3-diphenyl-1,1,5,5,7,7-hexamethyltetrasiloxane
A1-10: 1,7-divinyl-3,5-diphenyl-1,1,3,5,7,7-hexamethyltetrasiloxane
A1-11: 1,3-divinyl-5,7-diphenyl-1,3,5,7-tetramethylcyclotetrasiloxane
A1-12: 1,5-divinyl-3,7-diphenyl-1,3,5,7-tetramethylcyclotetrasiloxane
A1-13: Phenyl-tris(dimethylvinylsiloxy)silane Specific examples of component (A2) in the present invention include the following compounds A2-1 to A2-9.
A2-1: 1,3-di(3-butenyl)-1,1,3,3-tetramethyldisiloxane
A2-2: 1,3-di(5-hexenyl)-1,1,3,3-tetramethyldisiloxane
A2-3: 1,3-di(7-octenyl)-1,1,3,3-tetramethyldisiloxane
A2-4: 1,5-divinyl-1,1,3,3,5,5-hexamethyltrisiloxane
A2-5: 1,5-(3-butenyl)-1,1,3,3,5,5-hexamethyltrisiloxane
A2-6: 1,5-(5-hexenyl)-1,1,3,3,5,5-hexamethyltrisiloxane
A2-7: 1,5-(7-octenyl)-1,1,3,3,5,5-hexamethyltrisiloxane
A2-8: Methyl-tris(dimethylvinylsiloxy)silane
A2-9: Tetrakis(dimethylvinylsiloxy)silane The amount of component (A) is not limited so long as the viscosity of the entire curable liquid silicone composition of the present invention as a whole, as measured at 25° C. using an E-type viscometer, is 500 mPa·s or less, but in order to design within this viscosity range, when the total amount of the aforementioned component (A), with components (C), (D), and (B) described later is 100 parts by mass, 5 to 99 parts by mass is appropriate. A preferred amount is 5 to 80 parts by mass, and a more preferred amount is 5 to 60 parts by mass. This is because, if the amount of component (A) is equal to or higher than the lower limit of the aforementioned range, it is easy to make the resulting curable composition have low viscosity. On the other hand, if the amount is equal to or lower than the upper limit of the aforementioned range, the mechanical properties of a resulting cured product are enhanced.

Either component (A1) or component (A2) may be used as component (A), or both may be used in combination in the curable liquid silicone composition of the present invention. Herein, the use of component (A1) is advantageous from the perspective of increasing the refractive index of the curable liquid silicone composition and cured product thereof, while the use of component (A2) is advantageous in order to efficiently reduce the overall viscosity of the liquid composition. Therefore, depending on a desired refractive index, viscosity, and other properties of the curable liquid silicone composition of the present invention, component (A1) or component (A2) is preferably used alone, or the compounding ratio of the two is preferably appropriately designed.

Note that when only component (A2), which is a chain or branched-chain organopolysiloxane (=siloxane oligomer) not having a monovalent functional group selected from aromatic groups with 6 to 12 carbon atoms and aralkyl groups with 7 to 12 carbon atoms, is used as component (A), the use of component (B) to be described later is particularly preferred. This is because the use of component (A) alone may make it difficult to design the refractive index at 25° C. and a wavelength of 847 nm of the entire liquid composition prior to curing to be 1.47 or higher.

Component (B) is an arbitrary configuration of a curable liquid silicone composition of the present invention, and is an organopolysiloxane having an average number of silicon atoms in a molecule that is greater than 5, having at least one alkenyl group with 2 to 12 carbon atoms, and in which 34% or more of the number of substitution groups on a silicon atom are monovalent functional groups selected from aromatic groups with 6 to 12 carbon atoms and aralkyl groups with 7 to 12 carbon atoms Such a component (B) contains many aromatic groups or aralkyl groups in a molecule, and therefore efficiently improves the refractive index of the entire composition and cured product thereof. Component (B) also preferably has at least two alkenyl groups with 2 to 12 carbon atoms in a molecule, and particularly preferably has alkenyl groups with 2 to 12 carbon atoms at both molecular terminals.

Examples of the alkenyl group in component (B) include vinyl groups, allyl groups, butenyl groups, pentenyl groups, hexenyl groups, heptenyl groups, octenyl groups, nonenyl groups, decenyl groups, undecenyl groups, and dodecenyl groups, but vinyl groups, allyl groups, 5-hexenyl groups, and 7-octenyl groups are preferable from the perspective of economic efficiency and reactivity. Furthermore, examples of groups bonded to a silicon atom other the alkenyl group in component (B) include: methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferable from the perspective of economic efficiency and heat resistance. On the other hand, examples of the monovalent functional group selected from aromatic groups with 6 to 12 carbon atoms and aralkyl groups with 7 to 12 carbon atoms include phenyl groups, tolyl groups, xylyl groups, and other aryl groups with 6 to 12 carbon atoms; and benzyl groups, phenethyl groups, and other aralkyl groups with 7 to 12 carbon atoms. Phenyl groups and phenethyl groups are preferred from the perspective of economic efficiency. The silicon atom in component (B) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

The viscosity of component (B) at 25° C. is not limited, but is within a range of 50 to 100,000 mPa·s, and preferably within a range of 100 to 100,000 mPa·s, within a range of 100 to 50,000 mPa·s, or within a range of 100 to 10,000 mPa·s. This is because, if the viscosity of component (B) is equal to or higher than the lower limit of the aforementioned range, the mechanical characteristics of the resulting cured product are improved. On the other hand, if the amount is equal to or lower than the upper limit of the aforementioned range, it is easy to make the resulting curable composition have low viscosity.

A linear polysiloxane is expressed by the following formula (1).

[Formula 1]

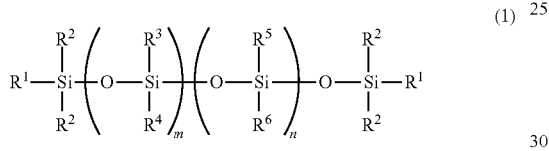

(1)

In the formula, $R^1$ represents the same or different alkenyl groups with 2 to 12 carbon atoms (terminal alkenyl groups), and examples include vinyl groups, allyl groups, butenyl groups, pentenyl groups, hexenyl groups, heptenyl groups, octenyl groups, nonenyl groups, decenyl groups, undecenyl groups, and dodecenyl groups, but vinyl groups, allyl groups, 5-hexenyl groups, and 7-octenyl groups are preferable from the perspective of economic efficiency and reactivity.

$R^2$ and $R^3$ each independently represent an unsubstituted or fluorine-substituted monovalent alkyl group with 1 to 12 carbon atoms, and examples include methyl groups, ethyl groups, propyl groups, butyl groups, pentyl groups, hexyl groups, heptyl groups, octyl groups, nonyl groups, decyl groups, undecyl groups, dodecyl groups, 3-chloropropyl groups, and 3,3,3-trifluoropropyl groups. Methyl groups are preferable from the perspective of economic efficiency and heat resistance.

$R^4$ independently represents an unsubstituted or fluorine-substituted monovalent functional group selected from aromatic groups with 6 to 12 carbon atoms and aralkyl groups with 7 to 12 carbon atoms, and examples include phenyl groups, tolyl groups, xylyl groups, benzyl groups, and phenethyl groups. Phenyl groups and phenethyl groups are preferred from the perspective of economic efficiency.

$R^5$ and $R^6$ each independently represent an unsubstituted or fluorine-substituted monovalent alkyl group with 1 to 10 carbon atoms or a monovalent functional group selected from aromatic groups with 6 to 12 carbon atoms and aralkyl groups with 7 to 12 carbon atoms, and examples of each include the same groups mentioned above. Examples include methyl groups, phenyl groups, tolyl groups, xylyl groups, benzyl groups, and phenethyl groups. A group selected from methyl groups, phenyl groups, and phenethyl groups is preferred from the perspective of economic efficiency.

However, in one molecule, 34% or more of substitution groups on silicon atoms, i.e., the number of all $R^1$ to $R^6$, are monovalent functional groups selected from aromatic groups with 6 to 12 carbon atoms and aralkyl groups with 7 to 12 carbon atoms.

Furthermore, m and n in the formula are numbers that satisfy $0 \leq m < 1{,}000$, $0 \leq n < 500$, $3 \leq m+n < 1{,}500$.

Such a component (B) can be one organopolysiloxane or a mixture of two or more organopolysiloxanes expressed by the following general formulae. Note that in the formula, Me, Vi, and Ph represent a methyl group, vinyl group, and phenyl group, respectively, and a and b are each preferably an integer of 1 or more, where the viscosity at 25° C. is within a range of 50 to 100.000 mPa·s. Herein, the value of a+b is 3 or more, and c is a number of 3 or more, where the viscosity at 25° C. is within a range of 50 to 100,000 mPa·s.

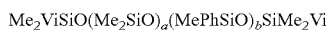

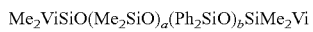

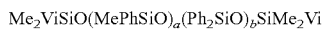

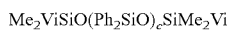

For the amount of component (B) added, when the total amount of component (A) above and components (C), (D), and (B) to be described later is 100 parts by mass, the amount of (B) is within a range of 1 to 90 parts by mass, and more preferably within a range of 1 to 80 parts by mass.

Component (C) is an essential component of the curable liquid silicone composition of the present invention and is an organopolysiloxane having at least two silicon-bonded hydrogen atoms in a molecule. Examples of groups that are bonded to a silicon atom other than silicon-bonded hydrogen atoms in component (C) include: methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; phenyl groups, tolyl groups, xylyl groups, and other aryl groups with 6 to 20 carbon atoms; benzyl groups, phenethyl groups, and other aralkyl groups with 7 to 20 carbon atoms; and 3-chloropropyl groups, 3,3,3-trifluoropropyl groups, and other halogen-substituted alkyl groups having 1 to 12 carbon atoms, but methyl groups and phenyl groups are preferable from the perspective of economic efficiency and heat resistance. Furthermore, the silicon atom in component (C) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups, and the like, to the extent that the object of the present invention is not impaired. Note that, because component (C) has excellent affinity with component (A), an organopolysiloxane having at least one aryl group in each molecule is preferable.

The viscosity of component (C) at 25° C. is not limited, but is preferably within a range of 1 to 10,000 mPa·s, within a range of 1 to 1,000 mPa·s, or within a range of 1 to 500 mPa·s. This is because, if the viscosity of component (C) is above the lower limit of the aforementioned range, the mechanical properties of the cured product obtained will be enhanced; however, if, on the other hand, the viscosity is below the upper limit of the aforementioned range, the transparency and handleability of the composition obtained will be enhanced.

While the molecular structure of component (C) is not particularly limited, examples thereof include linear structures, partially branched linear structures, branched structures, cyclic structures, and three-dimensional mesh structures. Component (C) may be a single organopolysiloxane having these molecular structures or a mixture of two or more organopolysiloxanes having these molecular structures.

Examples of such components (C) include, for example, (C1) linear organopolysiloxanes expressed by the general formula:

$$R^7_3SiO(R^7_2SiO)_kSiR^7_3$$

and/or
(C2) branched organopolysiloxanes expressed by the average unit formula:

$$(R^8_3SiO_{1/2})_v(R^8_2SiO_{2/2})_y(R^8SiO_{3/2})_z(SiO_{4/2})_w.$$

In component (C1), $R^7$ represents the same or different hydrogen atom, an alkyl group with 1 to 12 carbon atoms, aryl group with 6 to 20 carbon atoms, aralkyl group with 7 to 20 carbon atoms, or halogen-substituted alkyl group with 1 to 12 carbon atoms. Examples of alkyl groups of $R^7$ include methyl groups, ethyl groups, propyl groups, butyl groups, pentyl groups, hexyl groups, heptyl groups, octyl groups, nonyl groups, decyl groups, undecyl groups, and dodecyl groups. Furthermore, examples of aryl groups of $R^7$ include phenyl groups, tolyl groups, and xylyl groups. Furthermore, examples of aralkyl groups of $R^7$ include benzyl groups and phenethyl groups. Furthermore, examples of halogen-substituted alkyl groups of $R^7$ include 3-chloropropyl groups and 3,3,3-trifluoropropyl groups. However, at least two $R^7$s per molecule are hydrogen atoms.

Furthermore, in component (C1), in the formula, k represents an integer of 0 or more, and is preferably an integer in which the viscosity of component (C1) at 25° C. is within a range of 1 to 10,000 mPa·s, within a range of 1 to 1,000 mPa·s, or within a range of 1 to 500 mPa·s.

Such a component (C1) can be one organopolysiloxane or a mixture of two or more organopolysiloxanes expressed by the following general formulae. Note that in the formulae, Me and Ph represent methyl groups and phenyl groups, respectively, k' and k" each represent an integer that is 1 or higher where the viscosity at 25° C. is within a range of 1 to 10,000 mPa·s, and k'" is an integer of 2 or higher where the viscosity at 25° C. is within a range of 1 to 10,000 mPa·s.

$$Me_3SiO(Me_2SiO)_{k'}(MeHSiO)_{k'''}SiMe_3$$

$$Me_3SiO(MePhSiO)_{k'}(MeHSiO)_{k'''}SiMe_3$$

$$Me_3SiO(Ph_2SiO)_{k'}(MeHSiO)_{k'''}SiMe_3$$

$$Me_3SiO(Me_2SiO)_{k'}(Ph_2SiO)_{k''}(MeHSiO)_{k'''}SiMe_3$$

$$HMe_2SiO(Me_2SiO)_{k'}SiMe_2H$$

$$HMe_2SiO(Ph_2SiO)_{k'}SiMe_2H$$

$$HMe_2SiO(Me_2SiO)_{k'}(Ph_2SiO)_{k''}SiMe_2H$$

In component (C2), in the formula, $R^8$ represents the same or different hydrogen atom, alkyl group with 1 to 12 carbon atoms, aryl group with 6 to 20 carbon atoms, aralkyl group with 7 to 20 carbon atoms, or halogen-substituted alkyl group with 1 to 12 carbon atoms. Examples thereof include the same groups as those described above. However, at least two $R^8$s per molecule are hydrogen atoms.

Furthermore, in component (C2), in the formula, v, y, z, and w each represent a number from 0 to 1, and the sum of v, y, z, and w is 1. However, y, z, and w cannot be 0 at the same time.

Such a component (C2) can be one organopolysiloxane or a mixture of two or more organopolysiloxanes expressed by the following average unit formulae. Note that in the formulae, Me and Ph represent methyl groups and phenyl groups, respectively; v', v", y', z', and w' each represent a number of 1 or lower (however, 0 is not included), and the sum of v', v", y', z', and w' is 1.

$$(Me_3SiO_{1/2})_{v'}(Me_2HSiO_{1/2})_{v''}(Me_2SiO_{2/2})_{y'}(MeSiO_{3/2})_{z'}$$

$$(Me_3SiO_{1/2})_{v'}(Me_2HSiO_{1/2})_{v''}(MeSiO_{3/2})_{z'}$$

$$(Me_3SiO_{1/2})_{v'}(Me_2HSiO_{1/2})_{v''}(SiO_{4/2})_{w'}$$

$$(Me_2HSiO_{1/2})_{v''}(MeSiO_{3/2})_{z'}$$

$$(Me_2HSiO_{1/2})_{v''}(SiO_{4/2})_{w'}$$

$$(Me_3SiO_{1/2})_{v'}(Me_2HSiO_{1/2})_{v''}(MePhSiO_{2/2})_{y'}(PhSiO_{3/2})_{z'}$$

$$(Me_3SiO_{1/2})_{v'}(Me_2HSiO_{1/2})_{v''}(PhSiO_{3/2})_{z'}$$

$$(Me_2HSiO_{1/2})_{v''}(PhSiO_{3/2})_{z'}$$

$$(Me_2HSiO_{1/2})_{v''}(MePhSiO_{2/2})_{y'}(PhSiO_{3/2})_{z'}$$

$$(Me_2HSiO_{1/2})_{v''}(Ph_2SiO_{2/2})_{y'}(PhSiO_{3/2})_{z'}$$

In component (C), the aforementioned component (C1) or (C2) can be used alone or in combination. By mixing components (C1) and (C2), the mechanical properties of a resulting cured product can be improved. By mixing the components (C1) and (C2), the mass ratio of components (C1) and (C2) is preferably within a range of 10:90 to 95:5, within a range of 30:70 to 95:5, or within a range of 50:50 to 95:5.

The amount of component (C) is an amount where the silicon-bonded hydrogen atoms in the component is 0.2 to 3 mols relative to 1 mole of the total amount of alkenyl groups in the composition. More specifically, the amount is an amount where the silicon-bonded hydrogen atoms in the composition is within a range of 0.2 to 3 mols relative to 1 mol of the total amount of alkenyl groups (aliphatic unsaturated carbon-carbon bonds) in component (A) and the optionally included component (B). The amount of hydrogen atoms is preferably at least 0.3 mols, at least 0.4 mols, or at least 0.5 mols, or at most 2.5 mols, at most 2 mols, or at most 1.5 mols, or an amount that is within any of these upper and lower limits. This is because, if the content of component (C) is above the lower limit of the aforementioned range, the composition obtained will sufficiently cure; however, if, on the other hand, the content is below the upper limit of the aforementioned range, the mechanical properties of the cured product obtained will be enhanced.

Component (D) is a hydrosilylation reaction catalyst for promoting curing of the present composition. Examples thereof include platinum based catalysts, rhodium based catalysts, and palladium based catalysts, with platinum based catalysts being preferable. Examples of the platinum based catalyst include platinum fine powder, platinum black, platinum supporting silica fine powder, platinum supporting activated carbon, chloroplatinic acid, alcohol solutions of chloroplatinic acid, olefin complexes of platinum, and alkenylsiloxane complexes of platinum.

The amount of component (D) is an amount that promotes curing of the present composition and is specifically an amount in which platinum atoms in the catalyst are within a range of 0.1 to 1,000 ppm in mass units with regard to the present composition. This is because, if the content of component (D) is above the lower limit of the aforementioned range, curing of the composition obtained sufficiently progresses; however, on the other hand, if the content is at the upper limit or lower of the aforementioned range, discoloration of the cured product obtained is less likely to occur.

The present composition may contain a hydrosilylation reaction retarder in order to control the time to cure. Examples of the hydrosilylation reaction retarders include: alkyne alcohols such as 1-ethynyl cyclohexane-1-ol, 2-methyl-3-butyne-2-ol, 3,5-dimethyl-1-hexyne-3-ol, 2-phenyl-3-butyne-2-ol, and the like; enyne compounds such as 3-methyl-3-pentene-1-yne, 3,5-dimethyl-3-hexene-1-yne, and the like; methyl alkenyl siloxane oligomers such as 1,3,5,7-tetramethyl-1,3,5,7-tetravinyl cyclotetrasiloxane, 1,3,5,7-tetramethyl-1,3,5,7-tetrahexenyl cyclotetrasiloxane, and the like; alkynoxysilanes such as dimethyl bis(3-methyl-1-butyne-3-oxy)silane, methylvinyl bis(3-methyl-1-butyne-3-oxy)silane, and the like; alkyneoxysilane compounds such as methyltris(1-methyl-1-phenyl-propyneoxy)silane, dimethylbis(1-methyl-1-phenyl-propyneoxy)silane, methyltris(1,1-dimethyl-propyneoxy)silane, dimethylbis(1,1-dimethyl-propyneoxy)silane, and the like; and benzotriazoles.

Because the amount of the hydrosilylation reaction retarder is not limited and provides sufficient pot life to the present composition, the amount is preferably within a range of 0.0001 to 5 mass parts, within a range of 0.01 to 5 mass parts, or within a range of 0.01 to 3 mass parts, relative to 100 mass parts of the total of components (A) to (D).

Furthermore, in order to reduce the cross-linking density of the obtained cured product, thereby enhancing the mechanical properties and pressure-sensitive adhesion, the present composition may contain an organic compound having one aliphatic unsaturated bond and not having a siloxane bond, in one molecule. Such a compound is preferably an organic compound exhibiting favorable solubility with component (A) to component (D), along with favorable storage stability, and thus having a boiling point of 200° C. or higher at atmospheric pressure, for example. Specific examples include: linear aliphatic olefins such as dodecene, tetradecene, hexadecene, octadecene, and the like; cyclic aliphatic olefins such as 4-phenyl-1-cyclohexene, and the like; and unsaturated alcohols such as 9-decene-1-ol, oleyl alcohol, terpen-4-ol, and the like.

The amount of these compounds is not limited, but the amount is preferably within a range of 0 to 10 parts by mass or within a range of 0 to 5 parts by mass, relative to a total of 100 parts by mass of the curable composition in order for the curability of the present composition to be favorable and the mechanical properties of a resulting cured product to be favorable.

Furthermore, the present composition can contain a branched organopolysiloxane containing a siloxane unit expressed by the formula: $R^9SiO_{3/2}$ and/or a siloxane unit expressed by the formula: $SiO_2$ and having a monovalent functional group selected from aromatic groups with 6 to 12 carbon atoms and aralkyl groups with 7 to 12 carbon atoms, to the extent that the object of the present invention is not impaired. In the formula, $R^7$ represents an alkyl group with 1 to 12 carbon atoms, an alkenyl group with 2 to 12 carbon atoms, a hydroxyl group, or an alkoxy group with 1 to 6 carbon atoms. Examples of the alkyl group include methyl groups, ethyl groups, propyl groups, butyl groups, pentyl groups, hexyl groups, heptyl groups, octyl groups, nonyl groups, decyl groups, undecyl groups, and dodecyl groups. Furthermore, examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. Furthermore, examples of the alkoxy group include methoxy groups, ethoxy groups, propoxy groups, and butoxy groups. Note that when the siloxane unit expressed by the formula: $R^9SiO_{3/2}$ does not have an alkenyl group, a siloxane unit expressed by $R^{10}{}_3SiO_{1/2}$ and/or a siloxane unit expressed by the formula: $R^{10}{}_2SiO_{2/2}$ is preferably provided as another siloxane unit. Note that in the formula, $R^{10}$ represents an alkyl group with 1 to 12 carbon atoms, an alkenyl group with 2 to 12 carbon atoms, a hydroxyl group, or an alkoxy group with 1 to 6 carbon atoms. Examples thereof are the same as the groups described above. However, at least one $R^{10}$ in a molecule is an alkenyl group.

Examples of the branched organopolysiloxane include one organopolysiloxane or a mixture of two or more organopolysiloxanes expressed by the following average unit formulae. Note that in the formulae, Me, Vi, and Ph represent methyl groups, vinyl groups, and phenyl groups, respectively, i, i', j, k, and l each represent a number from 0 to 1 that expresses the ratio of component units (however, 0 is not included), and the sum of i, i', j, k, and l is 1.

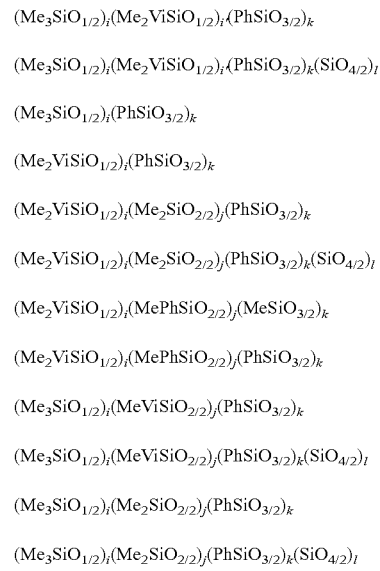

The amount of the branched organopolysiloxane is not limited, but is within a range of 0 to 20 parts by mass, and preferably within a range of 0 to 10 parts by mass or within a range of 0 to 5 parts by mass relative to 100 parts by mass of the curable composition. This is because when the amount of the branched organopolysiloxane is at or above the upper limit of the range above, the viscosity of the resulting curable composition increases.

Other Additives

In addition to the aforementioned components, an additional additive may be added to the composition of the present invention if desired. Examples of additives include, but are not limited to, those described below.

[Adhesion Imparting Agent]

An adhesion promoter can be added to the composition of the present invention to improve adhesion and close fitting properties to a substrate in contact with the composition. When the curable composition of the present invention is used for applications such as coating agents, sealing materials, and the like that require adhesion or close fitting properties to a substrate, an adhesion imparting agent is preferably added to the curable composition of the present invention. An arbitrary known adhesion promoter can be used, so long as the adhesion promoter does not interfere with a curing reaction of the composition of the present invention.

Examples of such adhesion promoters that can be used in the propyl include: organosilanes having a trialkoxysiloxy group (such as a trimethoxysiloxy group or a triethoxysiloxy group) or a trialkoxysilylalkyl group (such as a trimethoxysilylethyl group or triethoxysilylethyl group) and a hydrosilyl group or an alkenyl group (such as a vinyl group or an allyl group), or organosiloxane oligomers having a linear structure, branched structure, or cyclic structure with approximately 4 to 20 silicon atoms; organosilanes having a trialkoxysiloxy group or a trialkoxysilylalkyl group and a methacryloxyalkyl group (such as a 3-methacryloxypropyl group), or organosiloxane oligomers having a linear structure, branched structure, or cyclic structure with approximately 4 to 20 silicon atoms; organosilanes having a trialkoxysiloxy group or a trialkoxysilylalkyl group and an epoxy group-bonded alkyl group (such as a 3-glycidoxypropyl group, a 4-glycidoxybutyl group, a 2-(3,4-epoxycyclohexyl)ethyl group, or a 3-(3,4-epoxycyclohexyl)propyl group), or organosiloxane oligomers having a linear structure, branched structure, or cyclic structure with approximately 4 to 20 silicon atoms; organic compounds having two or more trialkoxysilyl groups (such as trimethylsilyl groups or triethoxysilyl groups); reaction products of aminoalkyltrialkoxysilane and epoxy group-bonded alkyltrialkoxysilane, and epoxide group-containing ethyl polysilicate. Specific examples thereof include vinyl trimethoxysilane, allyl trimethoxysilane, allyl triethoxysilane, hydrogen triethoxysilane, 3-glycidoxypropyl trimethoxysilane, 3-glycidoxypropyl triethoxysilane, 2-(3,4-epoxycyclohexyl)ethyl trimethoxysilane, 3-methacryloxypropyl trimethoxysilane, 3-methacryloxypropyl triethoxysilane, 1,6-bis(trimethoxysilyl)hexane, 1,6-bis(triethoxysilyl)hexane, 1,3-bis[2-(trimethoxysilyl)ethyl]-1,1,3,3-tetramethyldisiloxane, reaction products of 3-glycidoxypropyl triethoxysilane and 3-aminopropyl triethoxysilane, condensation reaction products of a methylvinyl siloxane oligomer blocked with a silanol group and a 3-glycidoxypropyl trimethoxysilane, condensation reaction products of a methylvinyl siloxane oligomer blocked with a silanol group and a 3-methacryloxypropyl triethoxysilane, and tris(3-trimethoxysilylpropyl)isocyanurate.

The amount of the adhesion promoter added to the curable composition of the present invention is not particularly limited, and is preferably within a range of 0 to 5 parts by mass, or within a range of 0 to 2 parts by mass, relative to a total of 100 parts by mass of components (A), (C), and (D) due to not promoting curing properties of the curable composition and discoloration of a cured product.

Furthermore, the present composition may contain a component that reduces the viscosity of the composition, and, if left in a cured product, does not affect properties thereof. There is no limitation on a structure thereof, but in consideration of miscibility with components (A) to (C), a compound is preferred, which has at least one monovalent functional group selected from aromatic groups with 6 to 12 carbon atoms and aralkyl groups with 7 to 12 carbon atoms in a molecule. Specific examples include diorganosiloxane oligomers having at least one monovalent functional group selected from aromatic groups with 6 to 12 carbon atoms and aralkyl groups with 7 to 12 carbon atoms in a molecule.

Examples of monovalent functional groups selected from aromatic groups with 6 to 12 carbon atoms and aralkyl groups with 7 to 12 carbon atoms are those described above. Phenyl groups and phenethyl groups are preferred. The compound does not have a hydrosilylation reactive functional group in a molecule. As the hydrosilylation reactive functional groups, alkenyl groups and silicon atom bonded hydrogen atoms are preferable. Examples of groups bonded to a silicon atom other the monovalent functional group in the compound include: methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferable from the perspective of economic efficiency and heat resistance.

Examples of specific molecular structures of such a compound include linear structures, partially branched linear structures, branched structures, cyclic structures, and three-dimensional network structures. Due to favorable affinity with a cured product obtained by curing the present composition along with great viscosity reducing effects, a cyclic structure is preferable. Such a compound is expressed by the general formula:

[Formula 2]

In the formula, R is the same or different monovalent hydrocarbon group free from an aliphatic unsaturated bond with 1 to 12 carbon atoms, with examples thereof including alkyl groups, aryl groups, aralkyl groups, and halogen substituted alkyl groups. However, at least one R in a molecule is a monovalent functional group selected from aromatic groups with 6 to 12 carbon atoms and aralkyl groups with 7 to 12 carbon atoms, and 5 to 60 mol % of all Rs in a molecule are particularly preferably the monovalent functional group. In the formula, x is an integer of 3 to 10.

The viscosity of the compound at 25° C. is not particularly limited, but is preferably within a range of 1 to 500 mPa·s, within a range of 1 to 300 mPa·s, or within a range of 1 to 100 mPa·s. This is because, if the viscosity of the compound is at or above the lower limit of the range above, the mechanical properties of the cured product obtained are not changed. On the other hand, if the viscosity is at or below the upper limit of the range above, the viscosity of the composition obtained can be sufficiently reduced.

The amount of such a compound is within a range of 0 to 25 parts by mass relative to a total of 100 parts by mass of the curable composition, and the upper limit thereof is preferably 20 parts by mass, 15 parts by mass, or 10 parts by mass.

[Other Additives]

Another additive may be added to the composition of the present invention in addition to or in place of the adhesion imparting agent described above, if desired. Examples of additives that can be used include leveling agents, silane coupling agents not included in those listed above as adhesion imparting agents, UV absorbers, antioxidants, polymerization inhibitors, fillers (reinforcing fillers, insulating fillers, thermal conductive fillers, and other functional fillers), and the like. If necessary, an appropriate additive can be added to the composition of the present invention. Furthermore, a thixotropy imparting agent may also be added to the composition of the present invention if necessary, particularly when used as a potting agent or sealing agent.

The refractive index of the curable composition of the present invention at 25° C. and a wavelength of 847 nm of the entire liquid composition before curing is 1.47 or higher. The value of the refractive index under these conditions is preferably 1.48 or higher. This property allows the refractive index of a cured product obtained by curing the present composition to be sufficiently high to reduce interfacial reflection between optical glass and another light-transmissive layer in various devices using an infrared LED as a light source, thereby improving light extraction efficiency.

In order to enable application to an injection molding method, the viscosity of the present composition is a viscosity value measured at 25° C. using an E-type viscometer that is 500 mPa·s or less. A preferred viscosity range is 5 to 200 mPa·s, under the aforementioned measurement conditions. A more preferred range is 5 to 100 mPa·s, and an even more preferred range is 10 to 100 mPa·s. This is because if the viscosity of the present composition is at or above the lower limit of the range above, the mechanical properties of the cured product obtained will be favorable. On the other hand, if the viscosity is at or below the upper limit of the range above, the injection moldability of the obtained composition will be enhanced and air is less likely to be entrained in a cured product.

The present composition can be prepared by uniformly mixing components (A), (C), and (D), and if necessary, another arbitrary component. When preparing the present composition, mixing can be performed at room temperature using various types of stirrers or kneaders, and if necessary, mixing can be performed while heating. Furthermore, the order of combining the various components is not restricted, and mixing can be performed in any order.

Moreover, the present composition can be a one part composition in which all of the components are blended in the same container, or can be a two part composition which mixes during use in view of storage stability. When the two part composition is used, one composition is a mixture of components (A), (B), and (D), along with any other components, while the other composition is a mixture of components (A), (B), and (C), along with any other components.

The present composition can be cured at room temperature or at a relatively low temperature (for example, 80° C. or lower). Note that the curing reaction of the present composition can be adjusted to a desired rate based on the concentration of a catalytic metal in component (D) and the type or amount of the hydrosilylation reaction retarder described above.

A cured product obtained by curing the present composition has a high refractive index, and the refractive index of the cured product is preferably 1.50 or higher at 25° C. and a wavelength of 847 nm. The value of the refractive index of the cured product under these conditions is preferably 1.52 or higher, and more preferably 1.54 or higher. This property allows the refractive index of a cured product obtained by curing the present composition to be sufficiently high to reduce interfacial reflection between optical glass and another light-transmissive layer in various devices using an infrared LED as a light source, thereby improving light extraction efficiency.

The present composition is useful as various types of impregnating agents, potting agents, sealing agents, and adhesives, and is particularly useful as an optical filler for forming a light-transmissive layer for various devices using an infrared LED, particularly for displaying devices. The cured product is suitable as a light-transmissive layer for displaying devices using an infrared LED due to being less susceptible to coloration and becoming cloudy under high temperature or high temperature and humidity.

The present composition cures at a relatively low temperature, and therefore can be suitably applied in coating a substrate with inferior heat resistance. The type of substrate is generally a transparent substrate such as glass, along with synthetic resin films, sheets, and transparent electrode coatings. Furthermore, injection molding is an example of a coating method for the present composition, utilizing the low viscosity properties thereof.

Next, the cured product of the present invention will be described in detail.

The cured product of the present invention is formed by curing the curable silicone composition described above. While the shape of the cured product is not limited, examples thereof include sheets, films, tapes, and lumps. Furthermore, integrating with various types of substrates is also possible.

The forming method of the cured product can be a method of applying the present composition to a film shaped substrate, tape shaped substrate, or sheet shaped substrate, then curing it by heating at room temperature or low temperature to form a cured film made of the cured product on the surface of the substrate. Furthermore, the present composition can be injected between two substrates and then cured by maintaining at room temperature or by heat treating to obtain a cured product integrated with the substrate. The film thickness of the cured product is not limited, but is preferably 1 to 3000 µm, and more preferably 10 to 2000 µm.

A displaying device of the present invention is prepared using the curable liquid silicone composition of the present invention. Examples thereof include LCDs (liquid crystal display), ECDs (electrochromic display), and other light receiving displaying devices, and ELDs (electroluminescent display) and other light emitting displaying devices. In the displaying device of the present invention, a space between a display part such as liquid crystal, organic EL, or the like and a display forming member such as a touch panel, cover lens, or the like, or between display forming members can be filled with the curable liquid silicone composition of the present invention to reduce interfacial reflection and improve light extraction efficiency.

A typical manufacturing method for the displaying device of the present invention is an injection molding method, utilizing the low viscosity properties of the curable liquid silicone composition. A specific example is a method of manufacturing a displaying device by injecting the present composition into a narrow gap between a substrate for an infrared LED light source and various transparent substrates, and then curing by heating.

The present invention is further described below based on Examples, but the present invention is not limited to the Examples below.

EXAMPLES

The curable liquid silicone composition and cured product of the present invention will be described in detail using examples. Note that in the formulae, Me, Ph, and Vi represent methyl groups, phenyl groups, and vinyl groups, respectively. Furthermore, in the examples, measurements and evaluations were carried out as described below.

[Viscosity of Curable Liquid Silicone Composition and Each Component]

An E-type viscometer VISCONIC EMD manufactured by TOKIMEC INC. was used to measure the viscosity of the curable liquid silicone composition and each component at 25° C. (mPa·s).

[Chemical Structure of Organopolysiloxane]

The chemical structure of the organopolysiloxane was identified by analysis using nuclear magnetic resonance spectroscopy.

[Appearance of Curable Liquid Silicone Composition]

The appearance of the curable liquid silicone composition was visually observed and evaluated as follows.

A: Transparent
B: Slightly cloudy

[Transparency and Haze of Cured Product]

The curable liquid silicone composition was filled between two glass sheets (filling area: 40×40 mm$^2$) to a thickness of 200 microns after curing, and then heated in an oven at 90° C. for 1 hour. The total light transmittance and haze of the cured sheet produced between two glass sheets were measured by a SH7000 haze meter manufactured by NIPPON DENSHOKU INDUSTRIES Co., Ltd. in accordance with a method specified in JIS K7361-1.

Hardness of Cured Product

The curable liquid silicone composition was introduced in a glass cup with a 25 mm diameter and depth of 10 mm, and then heated in an oven at 90° C. for 1 hour. The penetration of the cured product was measured at room temperature using a needle penetration tester in accordance with JIS K2207. For high hardness, measurement was performed using a Type A durometer in accordance with ASTM D2240.

[Refractive Index of the Cured Product]

Using the cured product prepared for hardness measurement as described above, the refractive index at a wavelength of 847 nm was measured at 25° C. with a Metricon model 2010/M prism coupler at 25° C.

Examples 1 to 9 and Comparative Example 1

Solvent-free curable liquid silicone compositions were prepared using the following components. Components (A) to (E) were mixed at room temperature using a rotating and revolving mixer to obtain a curable composition. The mixing ratios (parts by mass) of the components and the properties of the curable composition and cured product are summarized in Table 1.

The following compounds were used as component (A).
(A1): 1,5-divinyl-3,3-diphenyl-1,1,5,5-tetramethyltrisiloxane
(A2): Phenyl-tris(dimethylvinylsiloxy)silane
(A3): 1,3-di(5-hexenyl)-1,1,3,3-tetramethyldisiloxane The following organopolysiloxane was used as component (B).

Polymethylphenylsiloxane having a viscosity at 25° C. of 3,000 mPa·s and both ends of the molecular chain blocked with dimethylvinylsiloxy groups, expressed by the following formula:

The following component was used as component (C).
(C1): 1,1,5,5-tetramethyl-3,3-diphenyl trisiloxane
(C2): Organopolysiloxane having a viscosity of 20 mPa·s, expressed by the average unit formula:

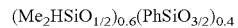

The following component was used as component (D).
A phenyltrisdimethylvinylsiloxysilane solution of a platinum (0)-1,3-divinyl-1,1,3,3-tetramethyldisiloxane complex having a platinum content of 0.45 mass %.

The following component was used as component (E).
A 1,5-divinyl-1,1,5,5-tetramethyl-3,3-diphenyltrisiloxane solution with 1 mass % of 1-ethynylcyclohexan-1-ol

TABLE 1

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| (A1) | 19.80 | 25.49 | 24.87 | 25.19 | | | | 18.00 | | |
| (A2) | | | | | 31.69 | 46.99 | 37.69 | 35.99 | | |
| (A3) | | | | | | | | | 7.24 | |
| (B) | 59.99 | 50.99 | 50.74 | 50.99 | 29.99 | | 29.99 | | 78.39 | 91.68 |
| (C1) | 13.20 | 15.30 | 19.90 | 18.50 | 37.98 | 48.69 | 31.98 | 45.69 | 12.44 | 6.30 |
| (C2) | 6.80 | 8.00 | 3.78 | 5.00 | | 4.00 | | | 1.64 | 1.70 |
| (D) | 0.22 | 0.22 | 0.22 | 0.22 | 0.22 | 0.22 | 0.22 | 0.22 | 0.09 | 0.22 |
| (E) | | | 0.50 | 0.10 | 0.10 | 0.10 | 0.10 | 0.10 | 9.20 | 0.10 |
| Total | 100.00 | 100.00 | 100.00 | 100.00 | 100.00 | 100.00 | 100.00 | 100.00 | 100.09 | 100.99 |
| Molar ratio of silicon-bonded hydrogen atoms* | 0.90 | 0.90 | 0.90 | 0.90 | 0.89 | 0.90 | 0.64 | 0.75 | 0.90 | 0.89 |
| Appearance of curable composition | A | A | A | A | A | A | A | A | A | A |
| Viscosity of curable composition | 152 | 94 | 76 | 77 | 25 | 7 | 23 | 6 | 244 | 1200 |
| Refractive index of curable composition | 1.51 | 1.51 | 1.51 | 1.51 | 1.49 | 1.47 | 1.49 | 1.48 | 1.52 | 1.53 |
| Appearance of cured product | A | A | A | A | A | A | A | A | A | A |
| Refractive index of cured product | 1.53 | 1.53 | 1.53 | 1.53 | 1.51 | 1.50 | 1.51 | 1 51 | 1.53 | 1.54 |
| Transmittance of cured product | >99.5 | >99.5 | >99.5 | >99.5 | >99.5 | >99.5 | >99.5 | >99.5 | >99.5 | >99.5 |
| Haze of cured product | <0.1 | <0.1 | <0.1 | <0.1 | <0.1 | <0.1 | <0.1 | <0.1 | <0.1 | <0.1 |
| Hardness (penetration) of cured product | 12 | 11 | 57 | 20 | | | 81 | 24 | 58 | 14 |
| Hardness (Type A hardness) of cured product | | | | | 30 | 52 | | | | |

*The number of mols of silcon-bonded hydrogen atoms in components (C1) and (C2) per 1 mol of the total amount of vinyl groups in components (A1), (A2), (A3), and (B)

From the results of Examples 1 to 9, the curable liquid silicone composition of the present invention has very low viscosity and favorable transparency. The transparency of the cured product obtained after curing was also confirmed to be high, and the refractive index, particularly in the infrared region, was also confirmed to be high. It was also demonstrated that the hardness of the cured product can be adjusted over a wide range by appropriately changing the components used and amount thereof. On the other hand, from the results of Comparative Example 1, the curable liquid silicone composition not containing component (A) was confirmed to have very high viscosity.

INDUSTRIAL APPLICABILITY

The curable liquid silicone composition of the present invention has very low viscosity at room temperature and is suitable for injection molding. Furthermore, curing occurs quickly by heat treating, thereby contributing to improved productivity. Furthermore, a resulting cured product has excellent transparency and a high refractive index, particularly in the infrared region (1.50 or higher), making it useful as a material for devices using an infrared LED light source.

The invention claimed is:
1. A curable liquid silicone composition, comprising:
(A) one or more types of organosilicon compound selected from the following component (A1) and component (A2):
  (A1) an organosilane or organopolysiloxane having 1 to 5 silicon atoms, having at least two alkenyl groups with 2 to 12 carbon atoms in a molecule, and having at least one monovalent functional group selected from aromatic groups with 6 to 12 carbon atoms and aralkyl groups with 7 to 12 carbon atoms, and
  (A2) a chain or branched-chain organosilane or organopolysiloxane having 2 to 5 silicon atoms, having at least two alkenyl groups with 2 to 12 carbon atoms in a molecule, not having a monovalent functional group selected from aromatic groups with 6 to 12 carbon atoms and aralkyl groups with 7 to 12 carbon atoms, and having a boiling point at ambient pressure of 180° C. or higher;
(B) an organopolysiloxane having an average number of silicon atoms in a molecule that is greater than 5, having at least one alkenyl group with from 2 to 12 carbon atoms, and in which 34% or more of the number of substitution groups on a silicon atom are monovalent functional groups selected from aromatic groups with 6 to 12 carbon atoms and aralkyl groups with 7 to 12 carbon atoms;
(C) a compound having at least two silicon-bonded hydrogen atoms in a molecule, present in an amount where the silicon-bonded hydrogen atoms in component (C) are 0.2 to 3 mols relative to a total of 1 mol of alkenyl groups in the composition; and
(D) a hydrosilylation reaction catalyst;
  wherein when the total amount of components (A), (C), (D), and (B) is 100 parts by mass, the amount of component (B) is within a range of 1 to 90 parts by mass; and
  wherein the refractive index, at 25° C. and a wavelength of 847 nm, of the entire liquid composition prior to curing is 1.47 or more, and the viscosity of the entire liquid composition, measured at 25° C. using an E-type viscometer, is 500 mPa·s or less.
2. The curable liquid silicone composition according to claim 1, wherein component (A) is (A2') a chain or branched-chain organopolysiloxane with 2 to 5 silicon atoms, having at least two alkenyl groups with 2 to 12 carbon atoms in a molecule, not having a monovalent functional group selected from aromatic groups with 6 to 12 carbon atoms and aralkyl groups with 7 to 12 carbon atoms, and having a boiling point at ambient pressure of 180° C. or higher.
3. The curable liquid silicone composition according to claim 1,
  wherein when the total amount of components (A), (C), (D), and (B) is 100 parts by mass, the amount of component (B) is within a range of 1 to 80 parts by mass.
4. The curable liquid silicone composition according to claim 1, wherein component (B) is a linear polysiloxane expressed by the following formula and having an alkenyl group on a molecular chain terminal:

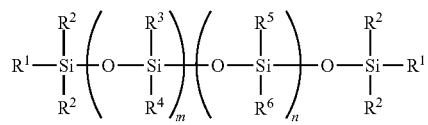

where
$R^1$ represents an alkenyl group with 2 to 12 carbon atoms;
  $R^2$ and $R^3$ each independently represent an unsubstituted or fluorine-substituted monovalent alkyl group with 1 to 10 carbon atoms;
  $R^4$ independently represents an unsubstituted or fluorine-substituted monovalent functional group selected from aromatic groups with 6 to 12 carbon atoms and aralkyl groups with 7 to 12 carbon atoms;
  $R^5$ and $R^6$ each independently represent an unsubstituted or fluorine-substituted monovalent alkyl group with 1 to 10 carbon atoms or a monovalent functional group selected from aromatic groups with 6 to 12 carbon atoms and aralkyl groups having 7 to 12 carbon atoms;
  m and n satisfy the relationships of $0 \leq m < 1{,}000$, $0 \leq n < 500$, $3 \leq (m+n) < 1{,}500$; and
  at least 34 mol % of the total number of $R^1$ to $R^6$ are monovalent functional groups selected from aromatic groups with 6 to 12 carbon atoms and aralkyl groups with 7 to 12 carbon atoms.
5. The curable liquid silicone composition according to claim 1, wherein the viscosity of the entire liquid composition, measured at 25° C. using an E-type viscometer, is 200 mPa's or less.
6. A cured product obtained by curing the curable liquid silicone composition according to claim 1.
7. The cured product according to claim 6, wherein the refractive index, at 25° C. and a wavelength of 847 nm, is 1.50 or more.
8. An optical filler, comprising the curable liquid silicone composition according to claim 1.
9. A displaying device, comprising a layer containing a cured product of the curable liquid silicone composition according to claim 1.
10. A method of manufacturing a displaying device, the method comprising:
  injecting the curable liquid silicone composition according to claim 1 between a substrate for a light source and a transparent substrate; and curing the curable liquid silicone composition after injection by heating.

* * * * *